United States Patent Office 3,521,664
Patented July 28, 1970

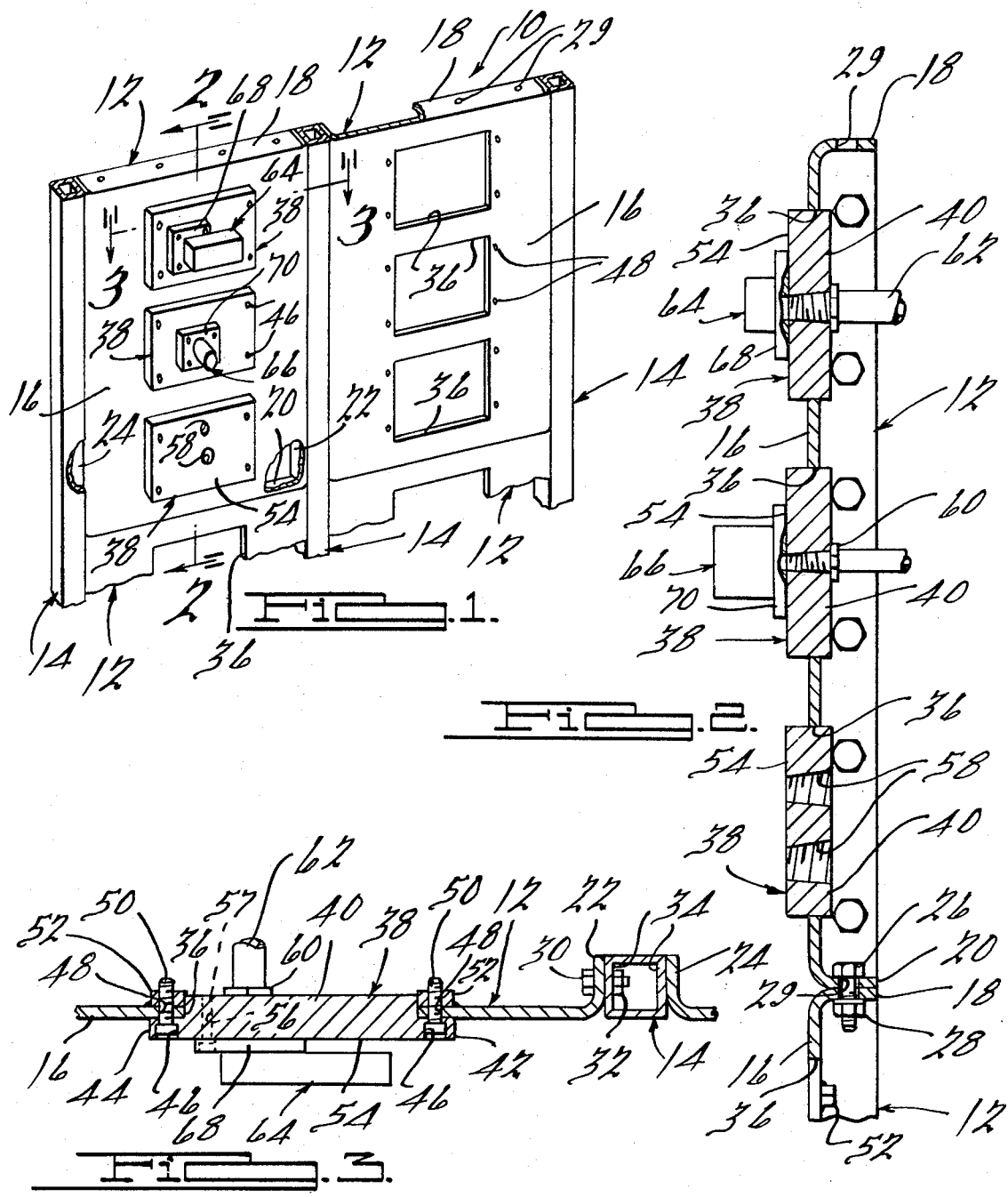

3,521,664
VALVE SUPPORTING PANEL BOARD ASSEMBLY
Edward J. Medici, 2808 Donegal, Troy, Mich.
Filed Apr. 23, 1968, Ser. No. 723,499
Int. Cl. F16l 5/00
U.S. Cl. 137—343     3 Claims

ABSTRACT OF THE DISCLOSURE

A panel board assembly adapted for operative association with a hydraulic valve system and comprising a plurality of standardized panels, each of the panels having a main plate section and a marginal flange section, the panels being arranged in coplanar relation with at least some of the marginal flange sections thereof abutting against one another; fastening means engageable with the flange sections of the panels for rigidly, yet detachably, securing the panels together to provide a rigid unitary panel board structure; at least one opening formed in the main plate section of each of the panels; a valve supporting sub-plate operatively associated with each of the openings, the sub-plates having a central portion of substantially complementary shape to the openings and adapted to be received therein; the sub-plates also comprising mounting portions projecting outwardly from the central portions thereof and adapted to be fixedly secured to the associated of the panels directly adjacent the periphery of the openings therein; fluid inlet port means providing a fluid inlet conduit and fluid outlet port means providing a fluid outlet conduit on each of the sub-plates, the fluid inlet and outlet port means being threaded to provide fluid pressure coupling means; the central portions of the sub-plates having a front face which is ground flat for sealably receiving a valve thereon, and valve mounting means for fixedly securing a valve to the front face of each of the sub-plates at a position in registry with the fluid inlet and outlet port means.

BACKGROUND OF THE INVENTION

Heretofore fluid pressure control valves have been mounted on panel boards which consisted of a sheet of iron or the like large enough to accommodate all the valves to be associated with a particular fluid system. Each valve was secured on mounting plates, and these plates were in turn attached to the panel board. Each of the mounting plates was provided with fluid pressure couplings extending out of that face which abutted against the panel board, and holes drilled through the panel board permitted the couplings to extend through the panel board to be connected to the lines of the fluid pressure system at the rearward side of the board. The mounting plates permitted the replacement of valves mounted on the plates with new valves without disconnecting the fluid pressure lines of the fluid pressure system.

In the event an additional valve was to be added to the fluid pressure system, additional holes would be drilled through the panel and the mounting plate for the new valve would be mounted on the panel with the fluid pressure couplings of the plate extending through the holes drilled in the panel. If a valve on the panel was to be replaced by another valve of a somewhat different design, the holes through the panel for the old valve would frequently not be spaced and sized correctly for the fluid pressure connections on the new valve, and substantial trouble was usually encountered in trying to mount the new valve on an already fully occupied panel of valves. This problem became of substantial magnitude with the design of new valves to replace those presently in operation, or to increase the fluid capacity of the fluid pressure system by using larger valves with larger mounting plates of differently spaced couplings than the couplings of the valve mounting plates presently in use. Moreover, if a valve mounted on the panel became defective during the operation of the machine controlled by the fluid pressure system of which the valve was a part, and the only available valve would not fit the mounting plate of the defective valve, the machine had to be shutdown while new holes were drilled through the panel to accommodate the mounting plate couplings for the new valve.

In U.S. Pat. No. 2,927,602, granted Mar. 8, 1960, for Valve Supporting Panel Board an apparatus is disclosed that attempted to overcome the aforesaid disadvantages through the provision of a panel board assembly comprising a plurality of standardized panels which, in addition to making up the panel board itself, served as the mounting plates for the various valves associated therewith. Although this patented construction has been found to be a considerable advance in the art, it was characterized by the inherent disadvantage that when a single valve on one of the panels needed to be replaced as being defective or for some other reason, it was necessary to remove an entire panel including those valves mounted thereon which were not in need of being removed.

The present invention is generally related to a panel board assembly as shown in the aforementioned United States patent; however, in accordance with the principles of the present invention the aforementioned inherent disadvantage of the patented construction is effectively obviated. More particularly, the panel board assembly of the present invention consists of a plurality of standardized panels, each of which is adapted to have one or more mounting plates "sub-plates" detachably secured thereto, the sub-plates being designed to receive and operatively support an associated valve member directly on one of the associated panels. In the event one of the valve members on the standardized panels become defective, its associated sub-plate may be conveniently removed for purposes of interchanging valves thereon, without necessitating removal or similar disturbance of any other of the valves of the system. In the event it is necessary or decided to remove all of the valves on a single panel, the entire panel can be conveniently removed without disturbing the other panels of the board assembly. Thus, the present invention will find universality of application and minimize to the extreme the manufacturing and attendant storage and inventory expenses associated with producing and handling the various panels and sub-plates therefor.

SUMMARY OF THE INVENTION

This invention relates generally to a composite panel board structure and, more particularly, to a new and improved panel board assembly adapted to operatively support a plurality of fluid pressure valves such as solenoid-controlled fluid pressure valves and related apparatus forming a part of a fluid pressure control system for machinery or the like.

It is accordingly a general object of the present invention to provide a new and improved valve supporting panel board assembly which overcomes the various disadvantages attendant similar type assemblies heretofore known and used.

It is a more particular object of the present invention to provide a new and improved panel board assembly of the above character which comprises a plurality of standardized panels, each of which is provided with one or more sub-plates adapted to operatively support an associated valve or the like.

It is another object of the present invention to provide a panel board assembly of the above character wherein the sub-plates may be readily removed or detached from their associated panels, and wherein the panels themselves may be conveniently removed when desired.

It is yet another object of the present invention to provide a new and improved panel board assembly of the above character which may be economically manufactured, conveniently assembled and disassembled, and which is readily adapted to have various types of valves and the like effortlessly assembled and disassembled thereon.

Other objects and advantages of the present invention will become apparent from the following detailed description taken in conjunction with the accompanying drawing.

BRIEF DESCRIPTION OF THE DRAWING

FIG. 1 is a fragmentary elevated perspective view of a preferred embodiment of the valve supporting panel board assembly of the present invention;

FIG. 2 is an enlarged fragmentary cross-sectional view taken substantially along the line 2—2 of FIG. 1, and FIG. 3 is a fragmentary cross-sectional view taken substantially along the line 3—3 of FIG. 1.

DESCRIPTION OF A PREFERRED EMBODIMENT

Referring now to the drawing, a valve supporting panel board assembly 10, in accordance with a preferred embodiment of the present invention, is shown as comprising a plurality of standardized panels, generally designated by the numeral 12, that are arranged in coplanar, substantially edge abutting relation and are secured together in a manner later to be described to form a rigid, substantially flat or planar structure.

The panels 12 are preferably of the same lateral width so that they may be operatively supported between the confronting sides of a plurality of preferably, although not necessarily, vertically oriented, spaced parallel support beams or columns, generally designated by the numeral 14, which are of square or rectangular cross section, as best seen in FIGS. 1 and 3. It will be noted, however, that the panels 12 may be of various lengths (heights), depending upon the particular size and type of valves operatively associated therewith and in accordance with a particular installation. Preferably, the relative sizes of the panels 12 are standardized so that they may be assembled in various combinations to fill out the assembly 10. By virtue of the fact that all of the panels 12 are of substantially the same construction, the following detailed description of one of said panels 12 will be applicable to each of the other panels 12, as will be apparent.

As best seen in FIG. 1, the panels 12 are generally platelike in shape and while shown as being rectangular, may readily be of a square configuration. Each of the panels 12 comprises a main plate section 16 and marginal flange sections 18, 20 and 22, 24 that extend rearwardly from and at generally right angles to the plate sections 16 at the upper and lower ends and at the laterally opposite sides, respectively, thereof. As shown in the drawing, the flange sections 18, 20 are adapted to be fixedly, yet detachably, secured to the marginal flanges of the directly adjacent-above and below panels 12 by means of suitable screws, bolts or the like 26 and nuts 28, the former of which extend through suitable openings 29 in said flanges 18, 20. Likewise, the flange sections 22, 24 are adapted to be secured by suitable screws, bolts or the like 30 and nuts 32 to the lateral sides 34 of the adjacent support columns 14, thereby providing the rigid, unitized panel assembly 10 illustrated in FIG. 1.

Referring to FIG. 1, it will be seen that the main plate sections 16 of the panels 12 are formed with one or more openings, generally designated 36, the number of which openings 36 corresponds to the number of valves which are to be mounted on each of the panels 12. Although three generally rectangularly shaped and vertically aligned openings 36 are shown provided in each of the plate sections 16, the number, shape and relative positions of such openings 36 may be varied pursuant to a particular operational environment.

Operatively associated with each of the openings 36 of the panels 12 is a generally flat or planar valve supporting sub-plate 38. Each of the sub-plates 38 comprises a central or intermediate section 40 which is of a complementary shape with respect to the associated opening 36, i.e., rectangular, and is adapted to be partially received therewithin, as best seen in FIGS. 2 and 3, whereby the sub-plates 38 are disposed in coplanar relation with the main plate sections 16 of the panels 12. Extending laterally outwardly from the opposite sides of each of the sub-plates 38 is a pair of mounting shoulder portions 42 and 44 that are adapted to abut against the front faces of the panel sections 16 directly adjacent the lateral ends of the openings 36 therein, as seen in FIG. 3. The shoulder portions 42, 44 are formed with countersunk bolt openings, generally designated 46, which are adapted to be aligned with suitable apertures 48 formed in the panel sections 16. Means in the form of suitable screws, bolts or the like 50 and nuts 52 are provided for fixedly, but detachably, securing the sub-plates 38 to the panels 12, as shown in FIG. 3. Preferably, the nuts 52 are fixedly secured, as by welding or the like, to the rearward sides of the panels 12 whereby to permit the sub-plates 38 to be attached to the assembly 10 from the front side thereof without requiring the use of any wrench-like or similar nut engaging tools.

The front faces, generally designated 54, of the sub-plates 38 are in a ground-flat condition, whereby the valves, hereinafter to be described, that are secured to and supported upon the sub-plates 38 may be sealingly engaged therewith. Each of the sub-plates 38 is provided with a plurality of suitable valve mounting bolt openings, generally designated 56, adapted to receive suitable screws, bolts or the like 57 for fixedly securing the various valves to the front faces 54 thereof. As best seen in FIG. 2, the sub-plates 38 are provided with fluid inlet and outlet port means or apertures 58 adapted to provide for fluid communication between the valves mounted on the front faces 54 and the fluid pressure system with which the valves are operatively associated. The apertures 58 may be and preferably are threaded to receive suitable fluid pressure couplings 60 which operatively connect fluid pressure lines or conduits 62 with the panels 12, as illustrated. The bolt holes 56 and apertures 58 on each of the sub-plates 38 are arranged in a predetermined layout or orientation to correspond with the bolt holes and inlet, outlet portions in the various valves which are mounted on the assembly 10. That is, each type or size of fluid pressure valve has a particular arrangement and the apertures 58 and bolt holes 56 are formed in the sub-plates 38 so as to correspond with these particular valve arrangements. There are presently an excess of twenty different standard arrangments of bolt holes and fluid ports in the various valves presently manufactured, and consequently, a similar number of sub-plates 38 having somewhat different arrangements of bolt holes and fluid apertures would be necessary to accommodate the various valves.

FIG. 4 shows a cross-sectional view of a portion of one of the panels 12 illustrated in FIG. 1. A pair of valves 64 and 66 having base portions 68 and 70, respectively, are adapted to be secured to the front faces 54 of the sub-plates 38 by means of the aforedescribed screws, bolts or the like 57 which extend through the valve base portions 68, 70. As illustrated, the interiors of the valves 64, 66 are adapted to be communicable with the associated fluid inlet and outlet conduits 62 by means of the fluid couplings 60 and apertures 58 in the sub-plates 38. As will be apparent, suitable gasket means (not shown) may be provided interjacent the rearward sides of the valves 64, 66 and the front faces 54 of the sub-plates 38 to provide for leakage-free joints therebetween.

The panel board assembly 10 is adapted to be supported in any one of a variety of different ways. For example, the panel board assembly 10 may be operatively mounted directly on the machinery which the valves on the panels 12 control or, alternatively, the assembly 10 may be supported by or upon the associated fluid reservoir tank, depending upon the particular operational environment and available facilities.

It will be seen from the above described construction of the panel board assembly 10 of the present invention that whenever it is decided to remove, replace or in some other manner deal with one of the valves mounted thereon, it is merely necessary to remove one of the sub-plates from the panels 12, without disturbing any of the other valves mounted thereon. Moreover, in the event it is decided to remove or replace all of the valves on one of the panels 12, the entire panel may be conveniently removed without disturbing any of the remaining panels 12 on the board. By virtue of the fact that each of the panels 12 is of standardized size with respect to the entire board assembly 10, as well as the fact that the various sub-plates 38 may be readily mounted in any one of the various openings 36 in the panels 12, a minimum number of panels 12 and associated sub-plates 38 are needed in order to make the panel assembly 10 universally adaptable for practically all types of installations. Moreover, such standardization will be found to minimize production and attendant inventory expenses to the extreme.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

What is claimed is:

1. In a panel board assembly adapted for operative association with an hydraulic fluid system comprising a plurality of fluid conduits and hydraulic pressure valves and the like, a plurality of standardized panels,
each of said panels comprising a main plate section and a marginal flange section,
said panels being arranged in coplanar relation with at least some of the marginal flange sections thereof abutting against one another,
fastening means engageable with said flange sections of said panels for rigidly, yet detachably, securing said panels together to provide a rigid unitary panel board structure,
a plurality of openings formed in said main plate section of at least one of said panels,
a valve supporting sub-plate operatively associated with each of said openings,
said sub-plates having a central portion of substantially complementary shape to said openings and adapted to be received therein,
said sub-plates also comprising mounting portions projecting outwardly from said central portions and adapted to be fixedly, yet detachably secured to the associated panel directly adjacent the periphery of said openings therein,
fluid inlet port means providing a fluid inlet conduit and fluid outlet port means providing a fluid outlet conduit on each of said sub-plates,
said fluid inlet and outlet port means being threaded to provide for fluid coupling means with the associated fluid conduits,
said central portions of said sub-plates having a front face being in a ground flat condition for sealably receiving a valve thereon, and
valve mounting means for fixedly securing a valve to said front face of each of said sub-plates at a position in registry with said fluid inlet and outlet means.

2. A panel board assembly as set forth in claim 1 wherein said marginal flange sections extend substantially at right angles to the plane of said main plate sections, and wherein said fastening means comprises bolt means extending through bolt receiving openings formed in said marginal flange sections of said panels.

3. A panel board assembly as set forth in claim 1 wherein said openings in said main plate sections of said panels are generally rectangularly shaped, wherein said central portions of said sub-plates are rectangularly shaped and adapted to be received within said openings, and wherein said mounting portions of said sub-plates extend laterally outwardly from said central portions and overlie and are detachably secured to portions of said main plate sections located laterally outwardly from the ends of said openings.

References Cited
UNITED STATES PATENTS

| | | | |
|---|---|---|---|
| 2,831,649 | 4/1958 | Hayslett | 137—608 XR |
| 2,927,602 | 3/1960 | Eklund | 137—343 |
| 2,951,498 | 9/1960 | Carver | 137—343 |
| 2,992,315 | 7/1961 | McDonnold | 248—27 |
| 2,992,437 | 7/1961 | Nelson et al. | 137—360 XR |
| 2,992,438 | 7/1961 | Nelson et al. | 137—360 XR |
| 3,093,002 | 6/1963 | Logan et al. | 248—27 XR |
| 3,221,454 | 12/1965 | Togni | 137—608 XR |
| 3,384,115 | 5/1968 | Drazan et al. | 137—608 |
| 3,433,260 | 3/1969 | Higgins | 137—608 |

SAMUEL SCOTT, Primary Examiner

U.S. Cl. X.R.

248—27